March 2, 1971  W. J. JONES  3,567,387

CARBON DIOXIDE MONITOR

Filed Jan. 9, 1969  4 Sheets-Sheet 1

$CO_2 + LiOH \rightarrow Li_2CO_3 + H_2O$

WITNESSES

INVENTOR
William J. Jones
BY
ATTORNEY

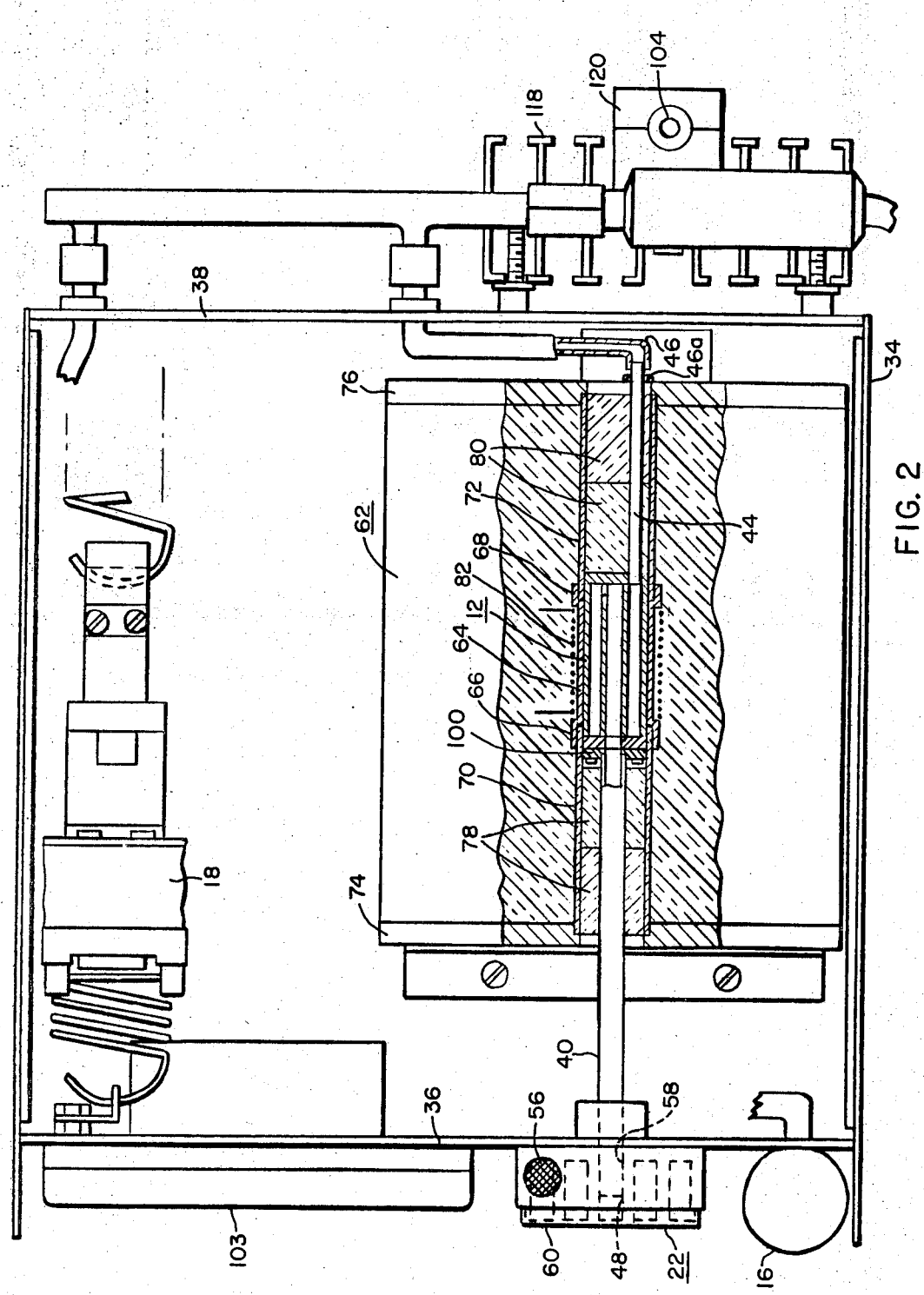

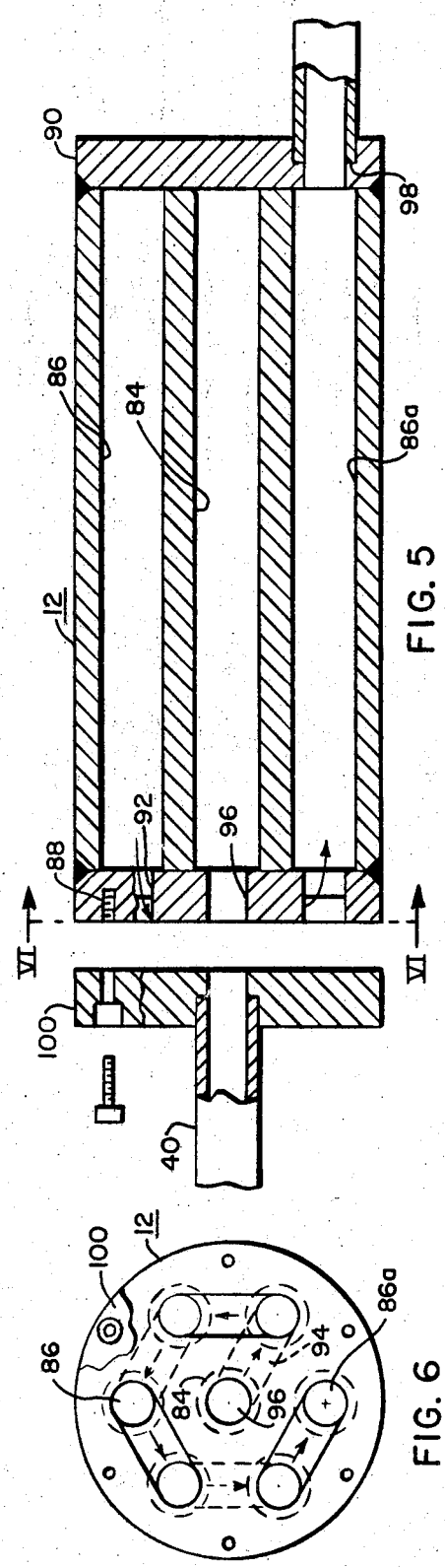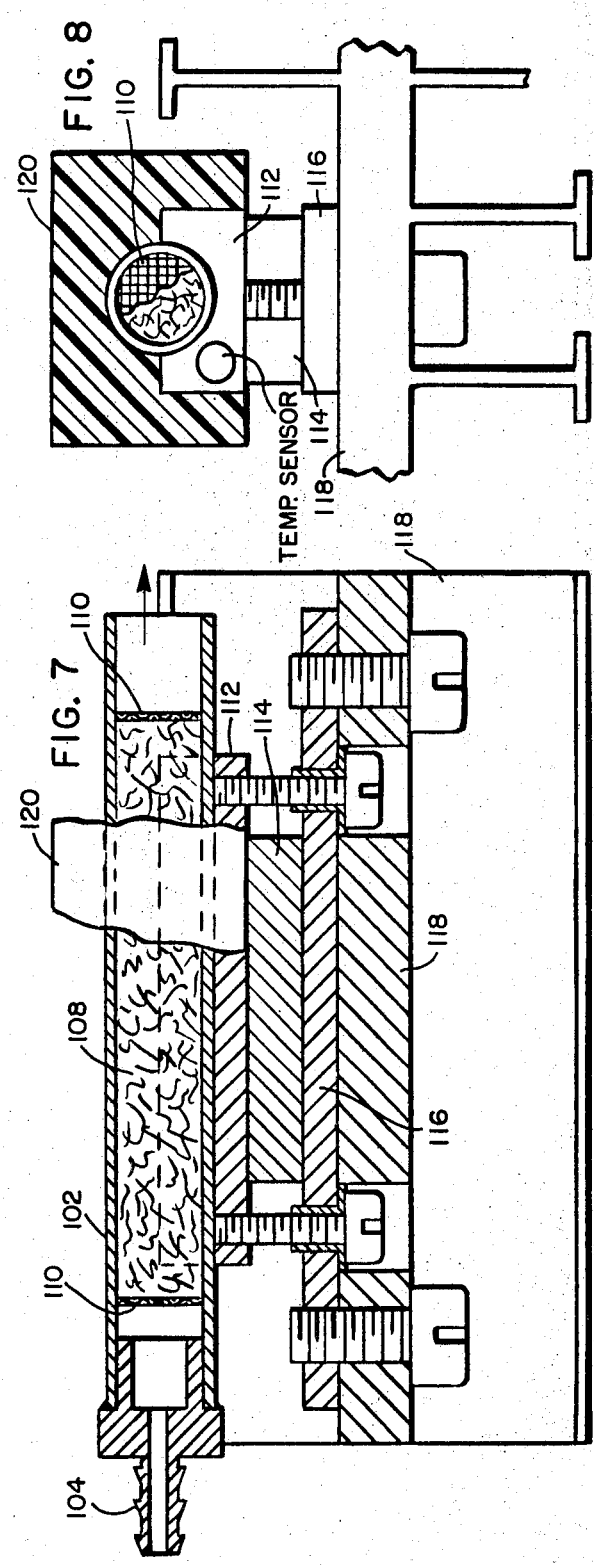

United States Patent Office 3,567,387
Patented Mar. 2, 1971

3,567,387
CARBON DIOXIDE MONITOR
William J. Jones, Pittsburgh, Pa., assignor to Westinghouse Electric Corporation, Pittsburgh, Pa.
Filed Jan. 9, 1969, Ser. No. 789,982
Int. Cl. G01n 7/00, 7/14, 7/18, 33/18
U.S. Cl. 23—232                                 9 Claims

ABSTRACT OF THE DISCLOSURE

An instrument for automatically and continuously monitoring the carbon dioxide partial pressure as for example in confined atmospheres of habitable environments, by reacting carbon dioxide in a sample gas stream with a hydroxide of an alkali metal or an alkaline earth metal to release water vapor and then measuring the increase in the partial pressure of water vapor in the gas stream, the partial pressure increase being related to the partial pressure of carbon dioxide initially present in the gas stream.

BACKGROUND OF THE INVENTION

Field of the invention

This invention relates to an apparatus and method for determining the amount of carbon dioxide present in the gaseous atmosphere of a habitable environment.

Description of the prior art

Various chemical techniques have been devised for measuring the concentration of carbon dioxide in the confined atmospheres of habitable environments, such as underwater vehicles, shelters, space vehicles, and the like. In general, such techniques offer the advantage of producing a simple effective, reliable, and inexpensive monitor.

A common procedure is the orsat type or manometric technique in which a gas batch sample of known volume is brought into contact with a selective $CO_2$ absorber allowed to reach an equilibrium, and the volume change due to $CO_2$ removal is subsequently measured. This technique has the disadvantage of yielding only discrete measurements at fairly long time intervals and usually requires manual operation. Also, being essentially a volumetric technique, it is less sensitive to a given $CO_2$ partial pressure in hyperbaric environments.

One continuous chemical technique has been devised which overcomes those limitations. It involves the reaction of a gas sample in a chemical bed whereby oxygen is released in proportion to the amount of original carbon dioxide present. The resulting incremental increase in oxygen partial pressure is then monitored to determine the carbon dioxide partial pressure in the sample. However the reaction is more complex and the oxygen released is not necessarily accurately proportional to the $CO_2$ content. This last procedure presents difficult measurement problems when oxygen is present in the gas stream being tested.

The present invention employs a technique in which the reaction of the sample gas in the chemical bed releases an amount of water vapor equal to the amount of carbon dioxide originally present.

U.S. Pat. No. 3,232,851 discloses an apparatus and method for determining the total carbon and hydrogen content in a combusted sample of an organic compound by a $CO_2$ to $H_2O$ replacement reaction. The system disclosed in that patent differs from that of the present invention in that the former is based upon a batch sample procedure involving the measurement of the total quantity of water released which is electrolytically dissociated and the electrical current required to do so is integrated over a discrete sampling period. The present invention is based upon a continuous reaction in which the instantaneous partial pressure of water ($pH_2O$) is the measured variable and is measured rapidly or promptly. In the apparatus of patent 3,232,851, the inherent characteristics of the apparatus do not depend upon time as a critical factor since the test results are for a batch or unit of material. No particular effort is made to secure results in any given time.

For continuous monitoring, two problems exist which are of little or no significance in the batch process. The outlet $pH_2O$ must equilibrate rapidly and precisely with the inlet $pCO_2$ value, and the reactor capacity must be sufficient to insure acceptably long reactor life before replacement or recharge. It has been found experimentally that the reactor exit $pH_2O$ response to changing inlet $pCO_2$ is governed primarily by the gas velocity in the reactor, higher flow rates yielding faster response. On the other hand, increased flow rate and flow volumes also causes a corresponding decrease in reactor life for a given capacity. The crux of the problem therefore is to design a reactor with sufficient flow velocity to obtain adequate and reliable response while maintaining acceptable reactor life. This has been accomplished in the present inevntion by establishing flow rate per unit of reactor containing granular metal hydroxide cross-sectional area in excess of 2 cc./sec.-cm.$^2$ and a minimum reactor length of 10 cm.

SUMMARY OF THE INVENTION

Generally, the device of the present invention comprises means for controlling the partial pressure of water vapor in a gas stream, means for reacting carbon dioxide in the gas stream with a granular hydroxide of at least one metal selected from a group consisting of alkali metals and alkaline earth metals (magnesium is an alkaline earth metal for the purpose of this invention) to form a metal carbonate and to release water vapor in a volume accurately proportional to the $CO_2$ reacted, and means for measuring the resulting water vapor partial pressure, determining the increase in $pH_2O$ over the initial $pH_2O$ and equating the increase of such pressure to a carbon dioxide value.

The invention also comprises a method including steps of controlling the amount of water vapor partial pressure in a gas stream, reacting the carbon dioxide in the gas stream with a hydroxide of a metal selected from the group consisting of an alkali metal and an alkaline earth metal, and magnesium, to produce reaction products including water vapor and the metal carbonate, measuring the resulting water vapor partial pressure, and equating the value of water vapor partial pressure relative to the control level to the carbon dioxide partial pressure of the gas stream.

Accordingly, it is a general object of this invention to provide a carbon dioxide monitoring system which operates continuously and avoids the disadvantages inherent in prior periodic operating devices.

It is another object of this invention to provide a carbon dioxide monitor which selectively measures the amount of carbon dioxide in a confined atmosphere by measuring water vapor pressure obtained by reacting the carbon dioxide to produce the water vapor.

Finally, it is an object of this invention to satisfy the foregoing objects and desiderata in a simple and effective manner.

BRIEF DESCRIPTION OF THE DRAWINGS

For a better understanding of the nature and objects of this invention, reference is made to the drawings, in which:

FIG. 2 is a top longitudinal view of the device showing the desiccant-reactor assembly in the completely installed and partially removed positions;

FIG. 5 is a longitudinal sectional view through the reactor;

FIG. 6 is a vertical sectional view taken on the line V—V of FIG. 5;

FIG. 7 is a longitudinal sectional view of the thermo-electrically cooled condenser assembly;

FIG. 8 is a vertical sectional view taken on the line VIII—VIII of FIG. 7; and

Similar numerals refer to similar parts throughout the several views of the drawing.

DESCRIPTION OF THE PREFERRED EMBODIMENTS

The primary reaction involved is to replace carbon dioxide with water in the gas being monitored. The second step involves the measurement of the final water vapor pressure which, and the difference as compared to the initial water vapor partial pressure in the incoming gas (if any), is numerically equal to the original carbon dioxide partial pressure.

The device may be operated by either controlling the water vapor partial pressure in the sample gas stream at the inlet of the reactor to a known value, or by measuring the reactor inlet-to-outlet water vapor partial pressure differential. In the former case the partial pressure of $CO_2$ is inferred by subtracting the water vapor control level from the measured level.

The reaction is dependent upon the use of hydroxides of alkali metals or alkaline earth metals, which reaction is typified by the following formula:

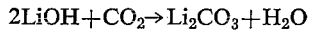

$$2LiOH + CO_2 \rightarrow Li_2CO_3 + H_2O$$

Figure 1:
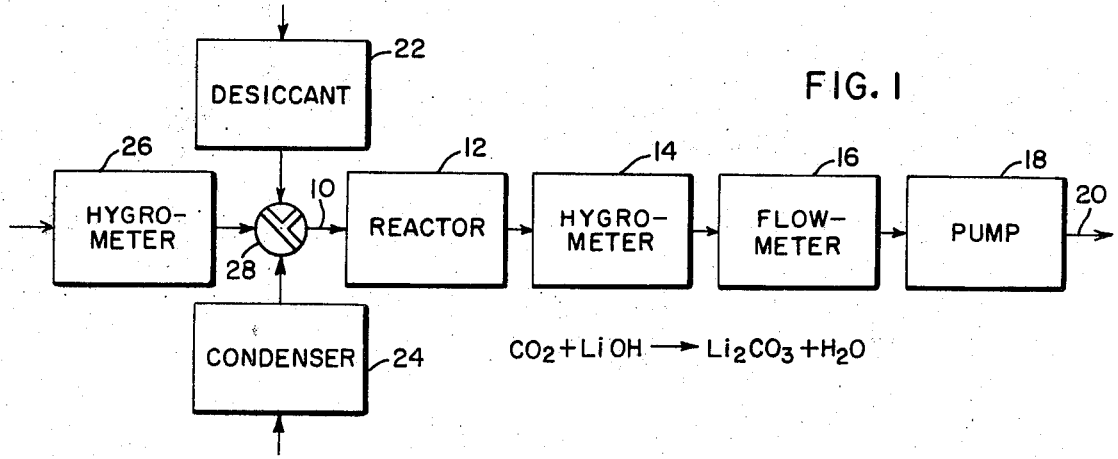
FIG. 1 is a schematic view of a system for monitoring carbon dioxide.

In FIG. 1 a schematic system is shown for continuously monitoring for carbon dioxide in air. The system includes a gas inlet 10, a reactor 12, a hygrometer 14, a flow meter 16, a pump 18, and an outlet 20. Before the air or gas sample enters the reactor 12, however the concentration of water is either measured, or partially or wholly removed in order to provide a basis upon which to determine the differential water concentration after the sample leaves the reactor 12. For that latter purpose a desiccant 22 is provided to substantially wholly remove moisture from the air sample before it enters the reactor 12. In the alternative, a refrigerated or cooled condenser 24 may be used to reduce the moisture content to a constant partial pressure of, say, 5 mm. Hg.

To accomplish the first alternative, a hygrometer 26 is used by which the moisture content of the incoming air is measured before it enters the air inlet 10. Inasmuch as the desiccant 22, the condenser 24, and the hygrometer 26 are used separately a three-way valve 28 may be provided for selecting the desired device.

Figure 3:
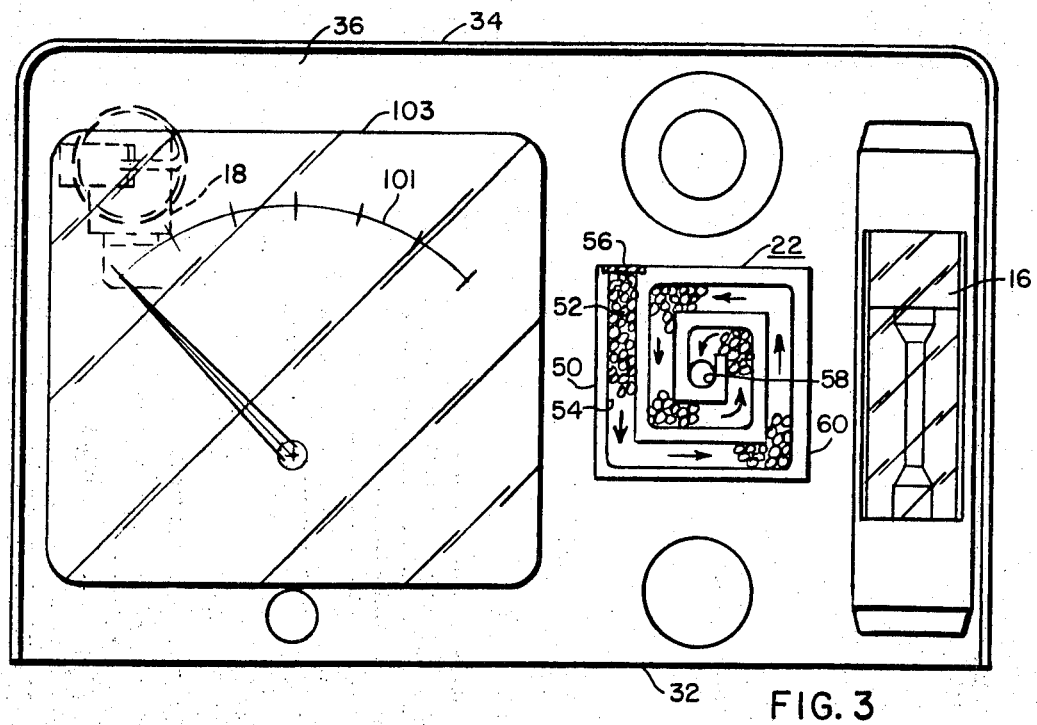
FIG. 3 is an end view of the device shown in FIG. 2 taken on the line III—III of FIG. 2.
Figure 4:
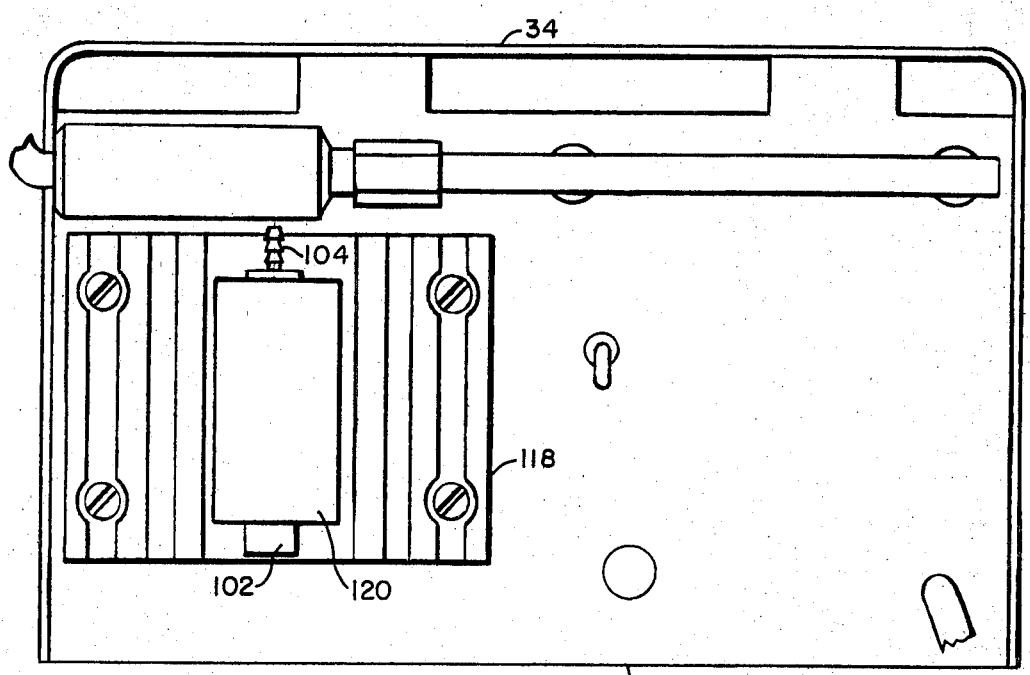
FIG. 4 is a rear end view of the device shown in FIG. 2 and taken on the line IV—IV of FIG. 2.

One embodiment of the invention is shown in FIGS. 2, 3 and 4, wherein the several elements 14 to 26 are contained within a housing 30 which includes at least four walls 32, 34, 36 and 38. As shown in FIG. 2, the reactor 12 is disposed at one end of an inlet tube 40. The outer end portion of the tube 40 extends through an aperture 42 in the wall 36 where the desiccant 22 is disposed. As shown in FIG. 2 an outlet tube 44 extends from the reactor 12 and communicates at its outer end with a conduit 46 which in turn communicates through the conduit 46 with the hygrometer 14. From the hygrometer 14 the gas flows via a conduit 48, passes through the flow meter 16 (FIG. 3) and the diaphragm pump 16 (FIG. 2) where the gas exhausts from the system.

As shown in FIG. 3, the desiccant 22 is a container 50 which is filled with granules of particles 52 of a desiccant, such as calcium chloride or anhydrous calcium sulphate, for absorbing a moisture from the incoming air to be monitored. More particularly, the container 50 is a box-like member having and containing an elongated tube 54 of spiral-like form extending from an inlet 56 in the container to an inlet 58 at the center of the container. The elongated spiral-like tube 54 is filled with granules 52 container to an outlet 58 at the center of the container. The tainer 50 may be composed of a solid, such as plastic. A closure cap 60 is disposed over the outer ends of the container 56 in an air-tight manner.

As shown in FIG. 2 the outlet end 58 is aligned and communicates with the inlet tube 40, whereby incoming air to be sampled after passing through the desiccant 22 enters the inlet tube 40 from where it passes into the reactor 12.

The reactor 12 is a cylindrical body located within a body 62 of insulation. The reactor 12 (FIG. 2) is encased in a cylindrical sleeve 64 having enlarged end portions 66 and 68 for receiving the ends of tubes 70 and 72, respectively. The opposite ends of the tubes are seated in end plates 74 and 76, respectively, which plates contain the body 62 of insulation. The end plates 74 and 76 are secured together in spaced relation by elongated bolt and nut assemblies (not shown) in a customary manner.

The tubes 70 and 72 are composed from an insulating material such as quartz. Spacers 78 and 80, composed of insulation material, are provided for reducing the axial heat loss from the reactor. The reactor 12 is heated by the provision of a coiled heater wire 82 around the sleeve 64 in a conventional manner. The temperature is from at least 225° C. to a temperature just below that at which the significant decomposition of the metal carbonate, such as $Li_2CO_3$ can occur.

In FIGS. 5 and 6, the reactor 12, shown in enlarged section, is a rigid member preferably composed of metal such as stainless steel and is provided with a plurality of spaced bores including a central bore 84 and outer surrounding bores 86. Slots 92 and 94 are provided to selectively connect the bores sequentially. The reactor 12 also includes a pair of end members 88 and 90, one member 88 being provided with tapped holes for attaching the cap 100 and the other member 90 being provided as a permanent end cap. In addition, the member 88 includes a central opening 96 by which the central bore 84 communicates with the inlet tube 40.

Likewise, the end member 90 is provided with an opening 98 by which the particular outer bore 86a communicates with the outlet tube 44. As shown in FIG. 2 the tube 40 is secured in place on the outer side of the member 88 by a flange 100 in a fluid-tight manner, whereby incoming air from the desiccant 22 enters the central bore 84 of the reactor then travels an elongated zig-zag path through the several outer bores 86 until it reaches the final outer bore 86a from where it passes into the outlet tube 44.

The several bores 84 and 86 of the reactor 12 are filled with a material which reacts carbon dioxide from the incoming gas and produces a by-product including water in accordance with the above chemical formula for LiOH. Such a material is a hydroxide of a metal of one or more of the alkali metals or alkaline earth metals which readily react with carbon dioxide and produce an equivalent of water vapor to the $CO_2$ reacted with the hydroxides.

The metal hydroxide is preferably in a porous granular state. Granules of from 5 to 50 mesh can be used. Good results were had with 10 to 20 mesh anhydrous LiOH. Inasmuch as the materials in both the desiccant 22 and the reactor 12 require replacement from time to time, the assembly of the desiccant, the tube 40, the reactor, the spacers 78 and 80, and the tube 44, is removable intact (FIG. 2). For that purpose the outer end of the tube 44 is detachably mounted in a fluid-tight manner on the condut 46 by an O-ring 46a.

As indicated by the foregoing formula the gas upon leaving the reactor includes additional water vapor which is conducted through a conduit 46 to a hygrometer 14 which is of conventional construction. A suitable absolute hygrometric technique is that disclosed in U.S. Pat. No. 2,381,299 which operates by automatically maintaining a film of deliquescent salt (LiCl) solution at a temperature at which it is in vapor pressure equilibrium with the sample gas partial pressure of water. The hygrometer 14 is used in conjunction with a scale 101 of an output meter 103 by which the partial pressure of $CO_2$ as related to the partial pressure of $H_2O$ is indicated directly and continuously.

Upon leaving the hygrometer 14 the gas being sampled passes downstream through the flow meter 16 and then the pump 18. The flow meter 16 (FIG. 3) is calibrated in relative units from 0–100 corresponding approximately with a sample flow rate in standard cc./minute, using air at atmospheric pressure.

The pump 18 is preferably a vacuum pump of the vibrator type. Manifestly, the sole purpose of the pump 18 is to pull the air sample continuously through the several elements of the monitor including the desiccant 22, the reactor 12, the hygrometer 14, and the flow meter 16. From the pump 18 the air is exhausted into the atmosphere. Where the monitor may be used between two gas zones of differential pressures, the pump 18 and also the flow meter 16 may be deleted if desired.

The foregoing sets forth a completely operative device for continuously monitoring for the presence of carbon dioxide in a gas. The desiccant 22 is employed primarily to control the amount of moisture in the gas stream such as by completely removing or minimizing the moisture to a predetermined value.

One alternative to the desiccant 22 is a means for measuring the amount of moisture in the inlet gas without changing its content. For that purpose the hygrometer 26 (FIG. 1), instead of the desiccant 22, may be used. The hygrometer 26 may be of a type similar to that of the hygrometer 14 described above, or a single differential-type hydrometer may be used. In such event, the resulting read out of partial pressure of $CO_2$ is dependent upon the differential in water vapor pressure between the hygrometers 16 and 26, the increase in moisture or water vapor pressure in the hygrometer 14 being a result of the increase in moisture introduced in the same at the reactor 12 in accordance with the formula set forth above.

As another alternative to the desiccant 22 the condenser 24 may be used which operates as a dehumidifier of the entering gas sample. Various types of dehumidifiers may be used. One type is a thermoelectrically-cooled condenser such as that shown in FIGS. 7 and 8. Such a condenser may be used to reduce the moisture content of the sample to be monitored to a constant low moisture level. As shown in FIG. 7 the condenser includes a metal tube 102 having an inlet end 104 and an outlet end 106, the latter of which may be connected to the air inlet 10 (FIG. 1).

The tube 102 is filled with metal wool 108, preferably copper, which is disposed between retaining screens 110. As shown in FIGS. 7 and 8 a greater surface portion of the tube 102 is seated in a cold plate 112. The cold plate 112 in turn is part of the thermoelectric device which includes a module, a hot plate 116, and a heat sink 118 of conventional construction. The upper portion of the tube 102 is enclosed in an insulation member 120.

Figure 9:
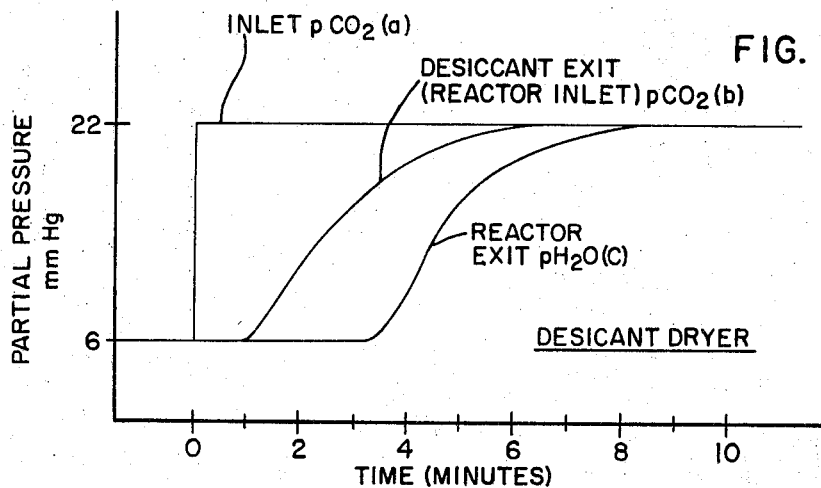
FIGS. 9 and 10 are graphs showing the response of the device with a desiccant and a thermoelectric condenser.
Figure 10:
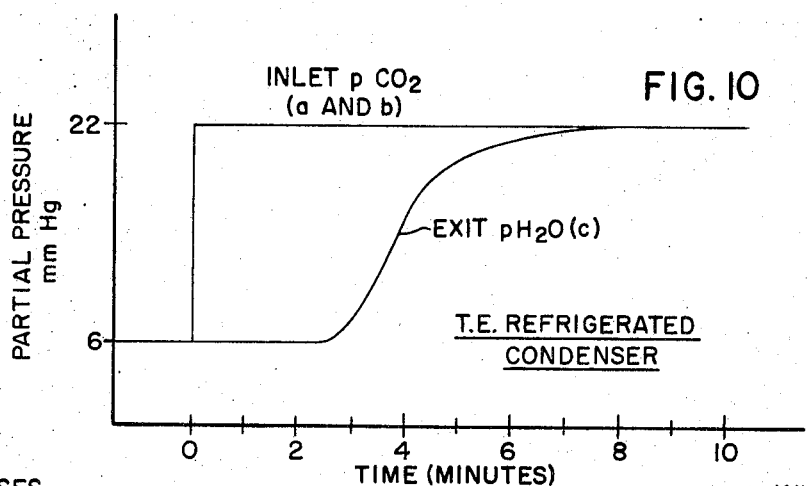

A comparison of the performance of the desiccant dryer with that of the thermoelectric condenser is shown in FIGS. 9 and 10. With regard to FIG. 9 the partial pressure of carbon dioxide in the incoming gas into the desiccant 22 is increased from 6 mm. to 22 mm. Hg at time zero. However, inasmuch as the desiccant material adsorbs some of the carbon dioxide there is a delay in equilibration of the gas at the exit end of the desiccant for which reason the partial pressure of carbon dioxide in the sample as it leaves the desiccant achieves 22 mm. Hg only after an elapse of several minutes. Equilibration of the partial pressure of water leaving the reactor is delayed additionally from the $CO_2$ content of the gas leaving the desiccant for which reason the water partial pressure curve leaving the reactor lags the $CO_2$ partial pressure leaving the desiccant.

In FIG. 10 a similar sample of carbon dioxide is introduced into the air stream and the partial pressure of $CO_2$ increases immediately from 6 to 22 mm. Hg. Where a thermoelectric condenser is substituted for a desiccant the delay in achieving equilibrium is reduced and the partial pressure of water leaving the reactor begins to respond to the increase of $CO_2$ content sooner than where a desiccant is substituted for such a condenser.

Varying circumstances dictate whether the desiccator or condenser should be used. Advantages of the desiccator include its simplicity, reliability, lack of a power requirement and relatively lightweight and compactness; but disadvantages include its slow response and its limited period of use due to the gradual depletion of the desiccant material and requirement for replacement thereof. On the other hand, a primary advantage of the condenser is its fast response and continuous performance over an indefinite period of time. A disadvantage of the condenser however is that it does require a power supply for operation.

Accordingly, the device of the present invention provides for means for continuously monitoring for carbon dioxide in gases and particularly in gas breathed by persons in undersea craft and other inhabitants with artificial atmospheres.

It is understood that the above specification and drawings are exemplary of the technically and economically feasible methods for producing a carbon dioxide monitor on a continuous basis which was heretofore unobtainable. Various modifications may be made within the spirit of the invention.

I claim:

1. A method for continuously monitoring for the amount of carbon dioxide present in a gas, comprisign the steps of (a) determining the amount of the water vapor partial pressure in the initial gas stream, (b) reacting $CO_2$ in the gas stream with a solid hydroxide of at least one metal selected from the group consisting of alkali metals and alkaline earth metals by flowing the gas stream through heated metal hydroxide at a rate to produce water vapor in a volume accurately porportional to the initial $CO_2$ content of the gas stream, (c) measuring the resulting initial to final water vapor partial pressure differential, whereby the value of water vapor partial pressure differential accurately indicates the initial carbon dioxide content of the gas stream.

2. The method of claim 1, wherein in step (b) the gas stream is passed through granular porous metal hydroxide at a flow rate corresponding to 2 cc./sec. per square centimeter of a metal hydroxide bed of a length of at least 10 centimeters.

3. The method of claim 1 wherein the metal hydroxide is lithium hydroxide.

4. The method of claim 1 wherein water vapor is initially substantially completely removed from the air stream.

5. The method of claim 1 wherein the granular metal hydroxide is heated to at least 250° C. but below the temperature at which any appreciable decomposition of the metal carbonate occurs.

6. The method of claim 1 wherein the initial $pH_2O$ in the gas stream is reduced to a low level by cooling the gas stream to a low temperature.

7. Apparatus for continuously monitoring for the presence of carbon dioxide in a gas stream comprising means for flowing the gas stream continuously, means for establishing an initial $pH_2O$ in the gas stream, means for continuously reacting carbon dioxide in the gas stream with a hydroxide of at least one metal selected from the group consisting of an alkali metal and alkaline earth metal to form a metal carbonate and release water vapor in proportion to the $CO_2$ content, and means for measuring the resulting water vapor partial pressure and means to indicate the increase of such pressure over the initial $pH_2O$ to correlate such increase to the carbon dioxide content of the gas stream.

8. The apparatus of claim 7 wherein the gas flow rate per unit of reactor cross sectional area is 2 to 10 cubic centimeters per second per square centimeter.

9. The apparatus of claim 8 wherein the reactor length exceeds ten centimeters.

References Cited
UNITED STATES PATENTS

| | | | |
|---|---|---|---|
| 3,041,878 | 7/1962 | McInroy | 73—29X |
| 3,232,851 | 2/1966 | Haber et al. | 23—232X |
| 3,360,980 | 1/1968 | Webb | 73—29 |

MORRIS O. WOLK, Primary Examiner

R. E. SERWIN, Assistant Examiner

U.S. Cl. X.R.

23—254; 73—29